(12) United States Patent
Rehn

(10) Patent No.: US 10,400,995 B2
(45) Date of Patent: Sep. 3, 2019

(54) ILLUMINATION APPARATUS FOR PRODUCING A RECTANGULAR LIGHT DISTRIBUTION IN AN ILLUMINATION PLANE

(71) Applicant: OSRAM GmbH, Munich (DE)

(72) Inventor: Henning Rehn, Berlin (DE)

(73) Assignee: OSRAM GMBH, Munich (DE)

( * ) Notice: Subject to any disclaimer, the term of this patent is extended or adjusted under 35 U.S.C. 154(b) by 244 days.

(21) Appl. No.: 15/475,185

(22) Filed: Mar. 31, 2017

(65) Prior Publication Data
US 2017/0284637 A1 Oct. 5, 2017

(30) Foreign Application Priority Data
Apr. 5, 2016 (DE) .................. 10 2016 205 590

(51) Int. Cl.
*F21V 13/04* (2006.01)
*F21V 5/00* (2018.01)
*G02B 15/14* (2006.01)
*G02B 27/09* (2006.01)

(52) U.S. Cl.
CPC .............. *F21V 13/04* (2013.01); *F21V 5/004* (2013.01); *F21V 5/007* (2013.01); *G02B 15/14* (2013.01); *G02B 27/0961* (2013.01)

(58) Field of Classification Search
CPC ........ G03B 21/00; G03B 21/10; G03B 21/28; G03B 21/2013; G03B 21/2033; F21V 5/004; F21V 5/007
See application file for complete search history.

(56) References Cited

U.S. PATENT DOCUMENTS

| 1,762,932 A | 6/1930 | Mihalyi |
| 2009/0021715 A1* | 1/2009 | Deguenther ........ G03F 7/70075 355/67 |
| 2010/0091249 A1* | 4/2010 | Benedix ................ G02B 13/16 353/31 |

(Continued)

FOREIGN PATENT DOCUMENTS

| DE | 968430 C | 2/1958 |
| DE | 102010039683 A1 | 3/2012 |

(Continued)

OTHER PUBLICATIONS

German Search Report based on application No. 10 2016 205 590.9 (8 pages) dated Dec. 22, 2016 (for reference purpose only).

*Primary Examiner* — Sultan Chowdhury
(74) *Attorney, Agent, or Firm* — Viering Jentschura & Partner MBB

(57) ABSTRACT

An illumination apparatus for providing light and for illuminating an illumination plane with a rectangular light distribution is provided. The illumination apparatus includes at least one light source configured to generate light, a collimation optical unit configured to collimate the light, a condenser optical unit configured to shape a rectangular angular distribution of the light coming from the collimation optical unit, and a freeform optical unit having at least one freeform area for modifying the angular distribution such that a rectangular light distribution is produced in an illumination plane that is optically connected downstream.

14 Claims, 6 Drawing Sheets

(56) References Cited

U.S. PATENT DOCUMENTS

| | | | |
|---|---|---|---|
| 2012/0147334 A1* | 6/2012 | Mizushima | G02B 13/007 |
| | | | 353/31 |
| 2012/0300469 A1 | 11/2012 | Jorgensen et al. | |
| 2013/0107232 A1* | 5/2013 | Tatsuno | G03B 21/28 |
| | | | 353/99 |
| 2013/0155379 A1 | 6/2013 | Morgenbrod et al. | |
| 2014/0340658 A1* | 11/2014 | Takano | G03B 21/28 |
| | | | 353/99 |
| 2015/0077725 A1 | 3/2015 | Shibayama | |
| 2015/0124225 A1 | 5/2015 | Akiyama | |
| 2016/0116735 A1* | 4/2016 | Hayashi | G02B 27/0101 |
| | | | 345/7 |
| 2017/0072839 A1 | 3/2017 | Schmidt et al. | |

FOREIGN PATENT DOCUMENTS

| | | |
|---|---|---|
| DE | 102013110272 A1 | 3/2015 |
| DE | 202015104894 U1 | 9/2015 |

* cited by examiner

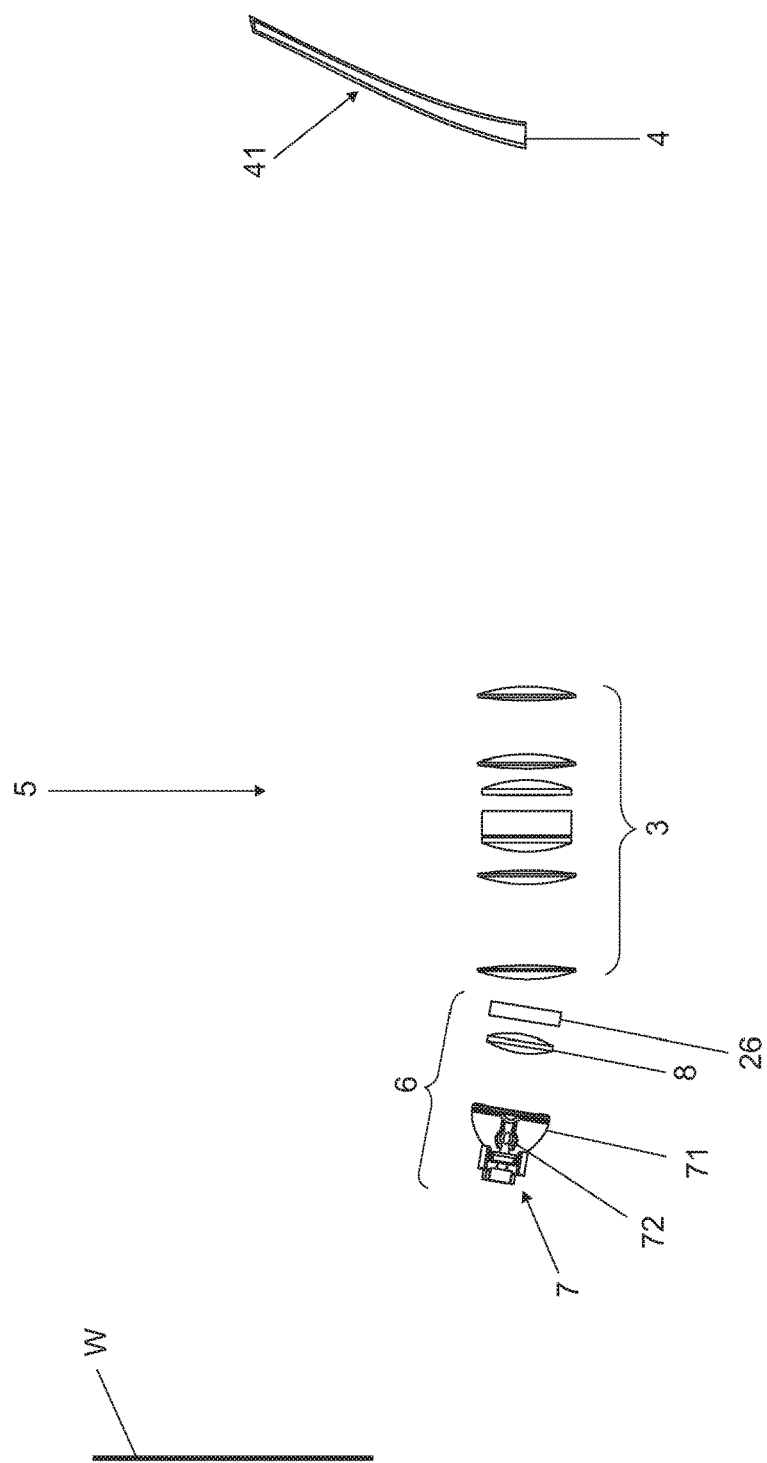

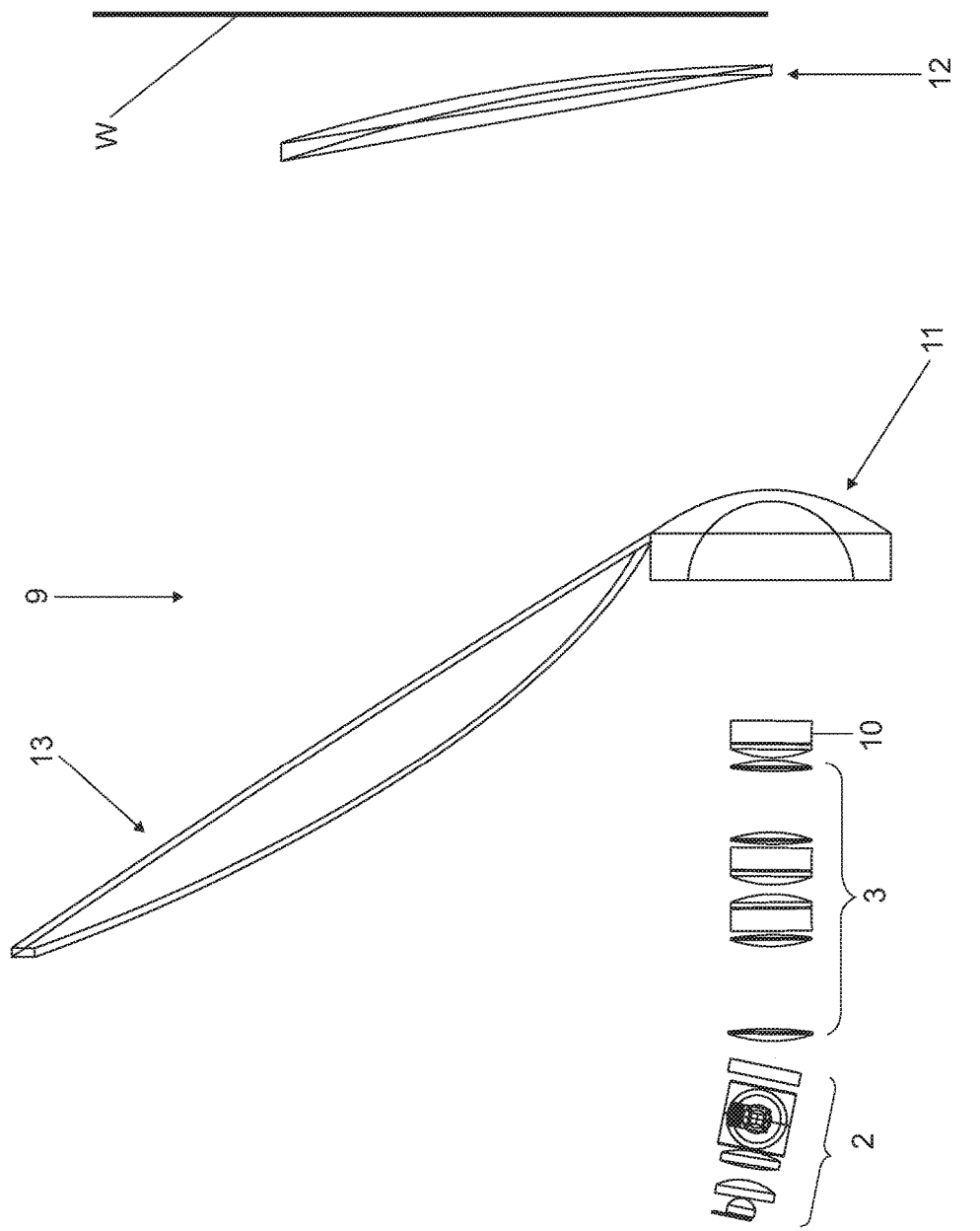

ILLUMINATION APPARATUS FOR PRODUCING A RECTANGULAR LIGHT DISTRIBUTION IN AN ILLUMINATION PLANE

CROSS-REFERENCE TO RELATED APPLICATION

This application claims priority to German Patent Application Serial No. 10 2016 205 590.9, which was filed Apr. 5, 2016, and is incorporated herein by reference in its entirety.

TECHNICAL FIELD

Various embodiments relate generally to an illumination apparatus for providing light. Various embodiments relate to an illumination apparatus for illuminating an area of defined delimitation, also referred to as "illumination area" below, in an illumination plane with a correspondingly shaped light distribution. The illumination plane can here be formed, for example, by the surface of a wall of a building or by a screen, a background of a television or movie studio, or a theater stage etc. Depending on the application, white or colored light is used, possibly in alteration or with any desired setting.

BACKGROUND

Illumination apparatuses for such illumination purposes, so-called "wash lights" or "cyclorama lights," are known. These lamps use, among other things, discharge lamps or recently also light-emitting diodes (LEDs) as light sources. Said light sources generally produce light which is inhomogeneous with respect to the light intensity distribution and/or color distribution thereof.

For this reason, the illumination intensity distribution and/or the color distribution (in colored or multi-colored light) within the illuminated area (illumination area) is uneven when conventional lamps are used. In addition, the form of the light distribution or of the illumination area is often distorted, asymmetric or misshapen in undesired fashion. This gives cause to problems as regards uniformity and external shape of the resulting illumination area, e.g. in the case of "stitching," that is to say when immediately joining two or more illumination areas together to form one contiguous larger illumination area by way of a corresponding number of lamps which are appropriately arranged.

SUMMARY

An illumination apparatus for providing light and for illuminating an illumination plane with a rectangular light distribution is provided. The illumination apparatus includes at least one light source configured to generate light, a collimation optical unit configured to collimate the light, a condenser optical unit configured to shape a rectangular angular distribution of the light coming from the collimation optical unit, and a freeform optical unit having at least one freeform area for modifying the angular distribution such that a rectangular light distribution is produced in an illumination plane that is optically connected downstream.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows an embodiment of the illumination apparatus with a reflector lamp; and FIG. 5 shows an embodiment of the illumination apparatus with light-emitting diodes and freeform mirror telescope.

DESCRIPTION

Figure 1:
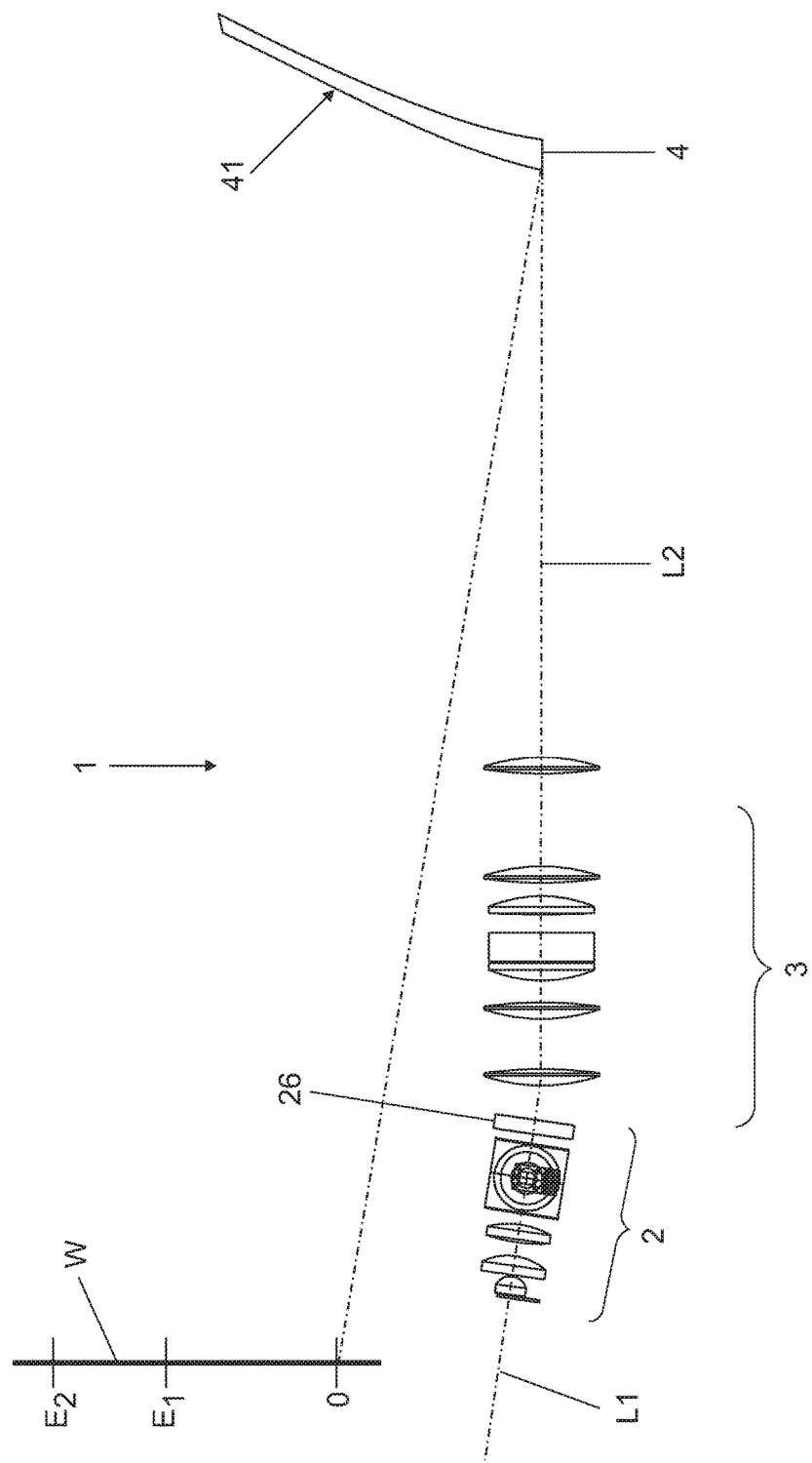
FIG. 1 shows an embodiment of the illumination apparatus with light-emitting diodes and freeform mirror.

The following detailed description refers to the accompanying drawings that show, by way of illustration, specific details and embodiments in which the invention may be practiced.

For the sake of simplicity, identical features or features of the same type can also be denoted below with the same reference sign.

Various embodiments illuminate a rectangular area in an illumination plane, i.e. to obtain a rectangular illumination area in this illumination plane. In addition, the disadvantages mentioned in the background section with respect to the uniformity of illumination intensity and possibly color distribution within the rectangular illumination area should be largely avoided.

A further aspect of various embodiments is that this type and geometric shape of illumination is obtained with relatively short distance between illumination apparatus and illumination plane. This is to rule out as far as possible undesired shading of this background illumination for example by persons (if the illumination apparatus is mounted to the floor or mounted near the floor) or ceiling installations (if the illumination apparatus is mounted to the ceiling).

Various embodiments provide an illumination apparatus for providing light and for illuminating an illumination plane having a rectangular light distribution, including at least one light source which generates light, a collimation optical unit which collimates the light, a condenser optical unit for shaping a rectangular angular distribution of the light coming from the collimation optical unit, and a freeform optical unit having at least one freeform area for modifying the angular distribution such that a rectangular light distribution is produced in an illumination plane that is optically connected downstream.

Configurations can be found in the dependent claims.

Protection is also sought for an illumination system having a plurality of illumination apparatuses according to various embodiments, in accordance with the claim that is directed at the illumination system.

The main idea of various embodiments is that of transforming light from one or more light sources into a rectangular light distribution using suitable optical elements in order to use it to produce a rectangular illumination area in an illumination plane. The term rectangular light distribution is here understood to mean that the light distribution in an illumination plane has an at least substantially rectangular shape. Slight deviations of the strongly geometric rectangular shape are not avoidable in practice and may even be desired, for example slightly blurred peripheries, slightly rounded corners, or the like. Outside this at least substantially rectangular shape, the light intensity certainly drops sharply, in other words is significantly lower than within, and may e.g. also practically be zero ("dark"). In other words, the illumination apparatus according to various embodiments is used to light only an at least substantially rectangular area in the illumination plane which is formed, for example, by a surface of a building wall or a screen. To this end, light having a rectangular angular distribution is shaped and projected onto the surface to be illuminated, for example a building wall or screen. However, no optical imaging takes place. There is likewise no need for the rectangular illumination area to be lit dynamically, such as for example by line-wise lighting with a relatively small circular light distribution. Instead, the light distribution is shaped such that it coincides geometrically with the desired illumination area. As a result, the desired illumination result can be achieved by way of a static solution. A complicated dynamic concept is not required.

The light coming from the at least one light source is initially collimated using a collimation optical unit, and then a rectangular angular distribution is shaped using a suitable condenser optical unit. A subsequent freeform optical unit modifies this angular distribution and thereby enables a relatively short distance from the illumination plane.

An afocal zoom optical unit can be optionally connected between the condenser optical unit and the freeform optical unit so that the extension of the rectangular light distribution in the illumination plane can be varied. Since the rectangular illumination area on the wall may not need to have or perhaps should not have sharp peripheries, the zoom optical unit can be designed without great peripheral sharpness, i.e. resolution in the peripheral region. In addition, the freeform mirror can be positioned closer to the exit pupil of the zoom optical unit.

The zoom optical unit can be designed in the form of a zoom lens system and have e.g. four to seven lenses, e.g. five lenses. The zoom lens system is additionally designed e.g. such that, when zooming, the two exterior lenses remain in position and only the central group moves.

In addition, the zoom optical unit can also be designed to be anamorphic, that is to say effect compression or stretching of the image, for example using an Alvarez lens system, that is to say a lens system consisting of two lens elements for continuously changing the sphero-cylindrical effect.

To make sure that the lower edge of the rectangular light distribution remains in position in the illumination plane during zooming, i.e. the light distribution increases, as it were, only upwardly and laterally, it is advantageous for the illumination apparatus to be designed such that the optical axis of the zoom optical unit is incident on the center of the lower edge of the rectangular light distribution, because the optical axis, or the light beam, remain unchanged in the optical axis during zooming.

In the case of a conventional arrangement of the illumination apparatus on the ground or at least near the ground, it should additionally be ensured that the light distribution that is incident on the zoom lens system (in angular space) contains only beams which are directed more or less downwardly (i.e. at an angle toward the ground).

This can be effected by an angular offset ("kink") between the optical axis of the condenser optical unit (which coincides with the optical axis of the entire light unit, consisting of light source, collimation and condenser optical units) and the optical axis of the zoom lens system, i.e. the optical axis of the zoom lens system and the optical axis of the condenser optical unit are not collinear to one another.

The offset may be half the vertical angular extent of the light coming from the condenser optical unit.

The optical axis of the zoom optical unit may be aligned horizontally, and perpendicularly to the illumination plane. In relation thereto, the optical axis of the condenser optical unit (and of the collimation optical unit which is connected upstream) is aligned downwardly at an angle (as viewed in the direction of the light propagation) in order to achieve the desired angle offset. This does not change even if the illumination apparatus is mounted and operated not on the ground or near the ground, but at the ceiling. The illumination apparatus remains unchanged in itself and is merely mounted upside down to the ceiling.

For producing the rectangular angular distribution, a honeycomb condenser whose honeycomb cells are designed in the form of rectangularly delimited micro-lenses has proven particularly suitable as the condenser optical unit. The input and output sides of the rectangularly delimited micro-lenses can have a spherical or aspherical design. The rectangularly delimited micro-lenses are used to achieve a rectangular angular distribution. In addition, the honeycomb condenser is adapted to the angular distribution of the incoming light. It also serves for homogenizing the light distribution. For further details relating to honeycomb condensers, reference is made for example to the document U.S. Pat. No. 1,762,932 or DE 968 430 C.

Suitable light sources are, among others, lamps, in particular discharge lamps, but also semiconductor light sources such as light-emitting diodes (LEDs) and laser diodes (LDs) and LARP technology (LARP: laser activated remote phosphor) which more recently has increasingly become the focus of discussions. For further details relating to LARP technology, reference is made for example to the document DE 10 2010 039 683 A1.

If conventional lamps are used, a color filter, for example a rotating color wheel having a plurality of color-selective filter segments, is necessary for generating colored light.

If alternatively semiconductor light sources are used, suitable emission wavelengths are commercially available, for example red (R), green (G) and blue (B). By way of suitable color light mixing, it is possible in principle to generate all the light colors located within the color space as defined by the RGB light colors, including white light. To keep the illumination apparatus as compact as possible, preference is given to combining the differently colored light beam bundles from the plurality of semiconductor sources using a beam combiner, for example a dichroic mirror arrangement, and guiding them to the condenser optical unit. In addition, LEDs having a high luminance are used preferably to delimit the necessary dimensions of the illumination system as far as possible. In various embodiments, the entire luminance may be more than 100 Mcd/m$^2$ (100 megacandelas per square meter).

For the alternative or combined use of LARP technology, phosphors having suitable emission wavelengths, for example in the red and green spectral ranges, at excitation with ultraviolet or blue pumped laser light, for example, are likewise commercially available. In addition, LARP technology can also be combined with additional semiconductor light sources that emit colored light.

The collimation optical unit must naturally be selected or designed to match the emission characteristic of the light source. For point-type light sources, such as for example short-arc discharge lamps, optical reflectors are suitable, for example parabolically or elliptically shaped reflectors. For LEDs, which typically have a Lambertian emission characteristic, and LDs, lens combinations of for example two lenses are common.

The freeform optical unit can be designed in the form of a freeform mirror, mirror telescope having two or three freeform mirrors, or one or more freeform lenses.

The at least one freeform area of the freeform optical unit can be calculated for example using the typical method of optical tailoring, which is typically implemented in software that is typical for the industry for calculating illumination solutions. Here, a point light source is assumed, and the freeform area is calculated such that a rectangular illumination area is lit in the illumination plane.

However, according to various embodiments, the freeform area is in fact not lit using a point light source, but using the light coming from the condenser optical unit or possibly the light from the entire exit pupil of the zoom optical unit. The blur of the rectangular periphery of the light distribution or of the illumination area that is caused thereby is, however, at least acceptable or even welcome, depending on the requirement of the respective application.

In order to achieve even larger contiguous illumination areas, a plurality of illumination apparatuses according to various embodiments can be combined to form a common illumination system. For this purpose, two or more illumination apparatuses are arranged next to one another, e.g. horizontally next to one another, specifically such that the respective light distributions or illumination areas immediately join one another or even slightly overlap ("stitching").

FIG. 1 shows a schematic illustration of an illumination apparatus 1 according to various embodiments for producing a rectangular light distribution or a rectangular illumination area on the surface of a wall W in a side view. The wall W is not part of the illumination apparatus and is not illustrated in its entire extent, but merely indicated symbolically.

Figure 2:
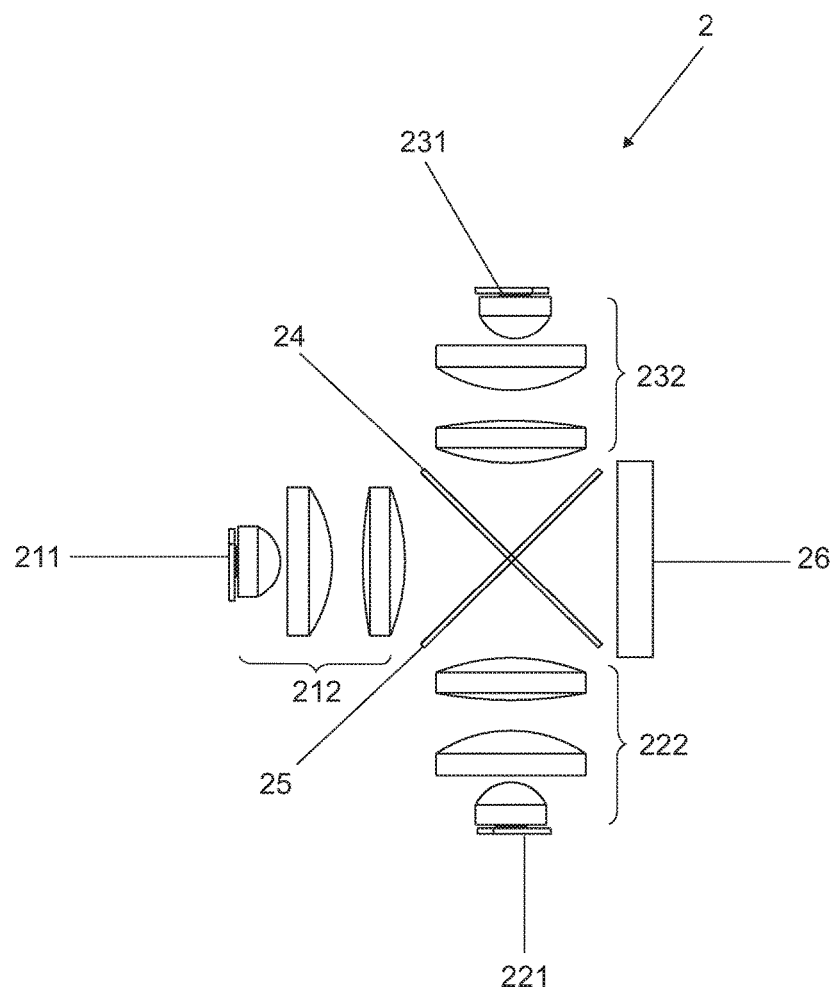
FIG. 2 shows the light unit of the illumination apparatus from FIG. 1 in an enlarged illustration.

The illumination apparatus 1 has the following components: a light unit 2, an afocal zoom lens system 3, and a freeform mirror 4. Reference is made to FIG. 2 for details of the light unit.

FIG. 2 shows a schematic illustration of the light unit 2 in plan view. The light unit 2 has three LED modules 211, 221, 231, each of which has a downstream collimation optical unit 212, 222, 232. The three collimation optical units 212, 222, 232, for example, have the same design and each includes three lenses. As a result, all the light refraction that is necessary for collimation is split over three optical elements, and optical errors of the respective entire collimation optical unit are thus reduced. In order to be able to achieve as high a luminous flux as possible, with dimensions that are as compact as possible, in each case a high-power light-emitting diode is used for the LED modules, as are also used for projection applications. The high-power light-emitting diode of the LED module 231 emits red light (R), the high-power light-emitting diode of the LED module 211 emits green light (G), and the high-power light-emitting diode of the LED module 221 emits blue light (B).

A beam combiner consisting of two intersecting dichroic mirrors 24, 25 is arranged downstream of the collimation optical units 212, 222, 232. The dichroic mirror 24 is designed to be reflective for the red light R of the LED module 231 and transmissive for the green light G of the LED module 211. The dichroic mirror 25 is designed to be reflective for the blue light B of the LED module 221 and transmissive for the green light G of the LED module 211.

The collimated mixed light thus combined from a red, green and blue component (RGB) passes, after the beam combiner 24, 25, to a honeycomb condenser 26. The honeycomb condenser 26 has a multiplicity of rectangularly delimited micro-lenses 26a as the honeycomb cells. The rectangular border surrounding the micro-lenses is preferably (mathematically) similar to and orientated like the LED chip surfaces or the printed circuit board of the LED modules 211, 221, 231, specifically in each case rather exactly perpendicular to the optical axis L1 of the light unit 2.

The honeycomb condenser can also be constructed from two identical microlens arrays (MLA) with a suitable distance. The rectangularly bordered micro-lenses can have a spherical form or an aspherical form.

The etendue of the honeycomb condenser 26 may be selected to be approximately 10% to 20% larger than that of the individual LEDs of the LED modules 211, 221, 231. The effects may be collection of the light emitted by the LEDs that is as efficient as possible, and avoidance or at least reduction of crosstalk between the channels which are formed by mutually opposite micro-lenses.

The afocal zoom lens system 3 has seven lenses and is designed such that the two external lenses remain in position during zooming, and only the central group is moved. The length is approximately 250 mm. Distortion is low in the entire field, and the resolution at the periphery is likewise low. This results in a rectangular illumination area having soft (blurred) peripheries on the surface of the wall W.

While the optical axis L2 of the zoom lens system 3 is aligned horizontally, and perpendicularly to the wall W, the optical axis L1 of the light unit 2 is, in relation thereto, likewise aligned in the drawing plane, but downwardly at an angle. The two optical axes L1, L2 are therefore not collinear, but are angularly offset by a "kink". The angular offset is equal to half the vertical angular size of the light coming from the condenser optical unit. In the embodiment, the vertical angular size of the light coming from the condenser optical unit 26 is ±8.9°, the horizontal angular size is ±4.7°. The values for the angular size relate to 50% of the maximum light intensity (FWHM) of the corresponding rectangular light distribution.

The optical axis L2 of the zoom lens system 3 is incident on the center of the lower edge of the rectangular light distribution (for example on the freeform mirror 4) or of the illumination area on the wall W. This is illustrated symbolically by the reference point 0 on the surface of the wall W in FIG. 1. In this way, the lower edge of the rectangular light distribution remains in position in the illumination plane (corresponds in the vertical to the reference point 0 in FIG. 1) during zooming; as it were the light distribution and subsequently the illumination area on the wall W increase only upwardly and laterally. This is illustrated symbolically in FIG. 1 by the two vertical markings E1, E2 for lighting at tele-setting or wide-angle setting of the zoom lens system 3. The lower edge (reference point 0) of the respective illumination area in both cases remains unchanged.

The light coming from the zoom lens system 3 is reflected by the freeform mirror 4 onto the surface of the wall W. Here, the optical path is reflected counter to the direction coming from the zoom lens system 3, specifically at an angle such that the light beams travel past the zoom lens system 3 to the wall, without any undesired shadow being cast in the process. In addition, the freeform mirror 4 is designed such that it modifies the angular distribution of the light coming from the zoom lens system 3 in order to enable as short a distance of the freeform mirror 4 from the wall W as possible. This distance is typically between approximately 50 and 100 cm. It is initially fixed for an illumination design and then typically not changed again. The dimensions of the illumination area $E_b$ on the surface of the wall W achieved together with the zoom lens system 3 are, in result, (2 m·3 m)·$(1+z)^2$, wherein z is the zoom factor and in the present case lies between approximately −20% and +20%.

Figure 3B:
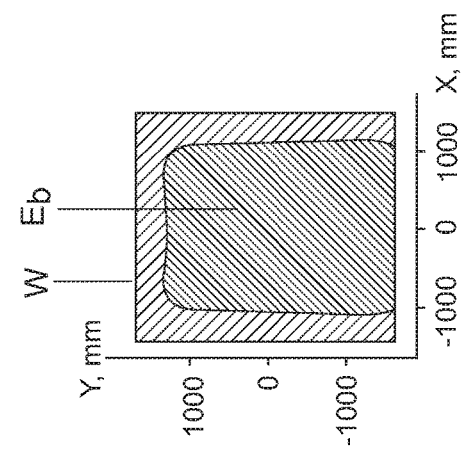
FIG. 3b shows the rectangular illumination area produced by the freeform mirror according to FIG. 3a with illumination with the light unit from FIG. 2.
Figure 3A:
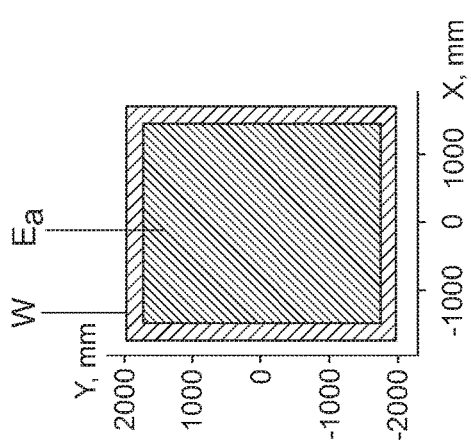
FIG. 3a shows a rectangular illumination area for calculating the freeform mirror when illuminating with a point light source.
Figure 6:
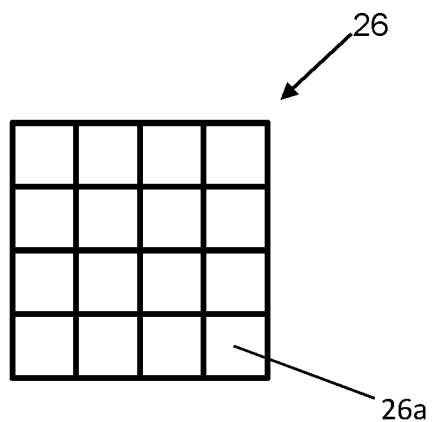
FIG. 6 shows a top view of the honeycomb condenser.

The freeform area 41 of the freeform mirror 4 is calculated by way of the method of optical tailoring that is customary in illumination software. Starting from a point light source, the freeform area 41 is calculated such that the rectangular illumination area $E_a$, shown in FIG. 3a, on the surface of the wall W (in FIG. 3a, FIG. 3b, only the illuminated section of the surface of the wall W is shown in each case) is produced. In fact, in the case of an extended light source, according to the light from the entire exit pupil of the zoom lens system 3, an illumination area $E_b$ with a blur in the rectangular periphery (cf. FIG. 3b) is produced. It has additionally been found that this blur is of the correct extent when a point on the lower edge of the freeform mirror 4 sees the exit pupil of the zoom lens system 3 at an angle of ±2.5° . . . ±10°. If the angle is selected to be greater than this value range, the light distribution smears too much and the intended rectangular illumination area is not achieved. If the angle is selected to be smaller, both the necessary distance between the zoom optical unit and the freeform mirror and thus also the required size of the freeform mirror increase.

In FIG. 1, the freeform mirror 4 is sectioned in a vertical plane containing the optical axis L2 of the zoom lens system 3. In fact, the freeform area 41 is not just curved in one direction, but two-dimensionally (not illustrated). The size of the freeform mirror 4 in this embodiment approximately corresponds to the size of a sheet of paper of between A5 and A4.

In principle, the freeform mirror 4 can also be replaced by a lens or a lens system having one or more freeform areas which are suitably shaped. However, stronger light deflections may be achieved with freeform mirrors than with freeform lenses.

Provided between the light unit 2 or the zoom lens system 3 and the freeform mirror 4, or even after the freeform mirror 4, can also be one or two plane mirrors for folding the optical path and thus decreasing the size of the entire system.

FIG. 4 shows a schematic illustration of a further illumination apparatus 5 according to various embodiments. It differs from the illumination apparatus 1 illustrated in FIG. 1 merely in terms of the modified light unit 6. The zoom lens system 3 and the freeform mirror 4, however, are unchanged. The light unit 6 comprises a reflector lamp 7, here specifically of the type P-VIP® from OSRAM. Mounted in the reflector 71 is a short-arc discharge lamp 72, which comes relatively close to a point light source. The reflector 71 acts together with a converging lens 8 as a collimation optical unit, that is to say somewhat like a parabolic reflector. The light that is thus collimated then reaches the honeycomb condenser 26. The rest corresponds to the situation in FIG. 1 and has already been described in detail there. For producing colored light, it is also possible for one or more color filters, for example a color filter wheel, to be provided in the light beam path of the illumination apparatus 5, for example between the collimation optical unit and the condenser optical unit.

FIG. 5 shows a schematic illustration of a further illumination apparatus 9 according to various embodiments. It differs from the illumination apparatus 1 illustrated in FIG. 1 in that the freeform mirror 4 has been replaced by a freeform mirror telescope. The freeform mirror telescope consists of two lenses 10, 11, and two freeform mirrors 12, 13 which fold the beam path twice, such that the lighting direction at the end—and as opposed to the variant shown in FIG. 1—is not inverted. In addition, both the total length of the illumination apparatus 9 and the distance of the last freeform mirror 11 from the wall W is less than in the variant shown in FIG. 1. The trade-off is not only a higher cost for a second freeform mirror, but also a necessary adaptation of the zoom lens system 3. In various embodiments, a relatively large lens 11 is additionally required for the freeform mirror telescope in order to ensure the necessary lighting of the first freeform mirror 12. As for the rest, the light unit 2 corresponds to that of the illumination apparatus 1 that is shown in FIG. 1 and described above.

LIST OF REFERENCE SIGNS 1 illumination apparatus
2 light unit
3 zoom lens system
4 freeform mirror
5 illumination apparatus
6 light unit
7 reflector lamp
8 converging lens
9 illumination apparatus
10 lens of the telescope
11 lens of the telescope
12 freeform mirror 1 of the telescope
13 freeform mirror 2 of the telescope
211; 221; 231 light-emitting diode modules
212; 222; 232 collimation optical units
24; 25 dichroic mirrors
26 honeycomb condenser
71 reflector (of the reflector lamp)
72 short-arc discharge lamp
W wall
0, E1, E2 vertical extent of the illumination area
Ea, Eb illumination area
L1 optical axis 1 (of the light unit)
L2 optical axis 2 (of the zoom lens system)

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An illumination apparatus for providing light and for illuminating an illumination plane with a rectangular light distribution, comprising:
   at least one light source configured to generate light;
   a collimation optical unit configured to collimate the light;
   a condenser optical unit configured to shape a rectangular angular distribution of the light coming from the collimation optical unit;
   a freeform optical unit having at least one freeform area for modifying the angular distribution such that a rectangular light distribution is produced in an illumination plane that is optically downstream from the freeform optical unit; and an afocal zoom optical unit, which is connected optically between the condenser optical unit and the freeform optical unit.

2. The illumination apparatus of claim 1, wherein the condenser optical unit is designed as a honeycomb condenser having rectangularly delimited micro-lenses as honeycomb cells.

3. The illumination apparatus of claim 1, wherein the freeform optical unit is designed as one of the following embodiments: freeform mirror, mirror telescope having two or three freeform mirrors, one or more freeform lenses.

4. The illumination apparatus of claim 1, wherein the optical axis of the condenser optical unit and the optical axis of the zoom optical unit are not aligned to be collinear with one another, but form an angular offset.

5. The illumination apparatus of claim 4, wherein the angular offset is selected such that the optical axis of the zoom optical unit is incident on the center of the lower edge of the rectangular light distribution.

6. The illumination apparatus of claim 4, wherein the angular offset corresponds to half the vertical angular size of the light coming from the condenser optical unit.

7. The illumination apparatus of claim 1, wherein the zoom optical unit is configured in the form of a zoom lens system having four to seven lenses.

8. The illumination apparatus of claim 7, wherein the zoom optical unit is configured in the form of a zoom lens system having five lenses.

9. The illumination apparatus of claim 1, wherein the zoom optical unit is designed to be anamorphic.

10. The illumination apparatus of claim 9, comprising an Alvarez lens system.

11. The illumination apparatus of claim 1, wherein the at least one light source comprises one or more elements or a combination of different elements from the group of the following light sources: discharge lamp, light-emitting diode, laser diode, laser activated remote phosphor.

12. An illumination system, comprising:
a plurality of illumination apparatuses, each illumination apparatus comprising:
at least one light source configured to generate light;
a collimation optical unit configured to collimate the light;
a condenser optical unit configured to shape a rectangular angular distribution of the light coming from the collimation optical unit;
a freeform optical unit having at least one freeform area for modifying the angular distribution such that a rectangular light distribution is produced in an illumination plane that is optically downstream from the freeform optical unit; and
an afocal zoom optical unit, which is connected optically between the condenser optical unit and the freeform optical unit;
wherein the plurality of illumination apparatuses are arranged in adjacent fashion.

13. The illumination system of claim 12, wherein the illumination apparatuses are arranged horizontally in adjacent fashion.

14. The illumination system of claim 12, wherein the illumination apparatuses are arranged in adjacent fashion, specifically in a manner such that the respective light distributions or illumination areas are joined to form a contiguous greater illumination area.

* * * * *